United States Patent
Vavassori et al.

(10) Patent No.: US 7,177,511 B2
(45) Date of Patent: Feb. 13, 2007

(54) OPTICAL FIBER, OPTICAL FIBER FILTER, AND OPTICAL AMPLIFIER

(75) Inventors: Paolo Vavassori, Bergamo (IT); Alessandro Iommi, Breno (IT)

(73) Assignee: Pirelli S.p.A., Milan (IT)

(*) Notice: Subject to any disclaimer, the term of this patent is extended or adjusted under 35 U.S.C. 154(b) by 116 days.

(21) Appl. No.: 10/415,474

(22) PCT Filed: Oct. 23, 2001

(86) PCT No.: PCT/EP01/12222

§ 371 (c)(1),
(2), (4) Date: Oct. 1, 2003

(87) PCT Pub. No.: WO02/37150

PCT Pub. Date: May 10, 2002

(65) Prior Publication Data

US 2004/0057685 A1   Mar. 25, 2004

(30) Foreign Application Priority Data

Oct. 31, 2000   (EP) .................... 00123718

(51) Int. Cl.
*G02B 6/02* (2006.01)
*G02B 6/36* (2006.01)

(52) U.S. Cl. ......................... 385/126; 385/28

(58) Field of Classification Search ............ 385/28, 385/123–128, 142
See application file for complete search history.

(56) References Cited

U.S. PATENT DOCUMENTS 4,768,851 A * 9/1988 Shaw et al. .................. 385/28
5,295,205 A   3/1994 Miller et al. .................. 385/1

(Continued)

FOREIGN PATENT DOCUMENTS

DE   197 27 125 A1   1/1999

(Continued)

OTHER PUBLICATIONS

P.E. Green, "Fiber Optic Networks", Prentice Hall, p. 123, (1993).

(Continued)

*Primary Examiner*—Sung Pak
*Assistant Examiner*—Daniel Petkovsek
(74) *Attorney, Agent, or Firm*—Finnegan, Henderson, Farabow, Garrett & Dunner, L.L.P.

(57) ABSTRACT

An optical fiber filter includes an optical fiber, a pair of first coupling regions, and a phase-shift region. The optical fiber includes a core and a cladding. An optical signal can pass through the optical fiber. The first coupling regions are formed in the optical fiber, at a predefined mutual distance, for producing power transfer between first and second propagation modes of the optical signal. The phase-shift region is defined by a section of the optical fiber, disposed between the first coupling regions, for producing a phase shift between the first and second propagation modes of the optical signal. In the first coupling regions, the optical fiber includes, in cross-section, an asymmetrical refractive index profile. A related optical fiber filtering device, optical fiber, process for producing an optical filter, optical amplifier, optical telecommunications system, optical fiber modal coupler, and method for filtering an optical signal are also disclosed.

15 Claims, 9 Drawing Sheets

U.S. PATENT DOCUMENTS

| | | | |
|---|---|---|---|
| 5,329,607 A | | 7/1994 | Kamikawa et al. ......... 385/123 |
| 5,479,551 A | * | 12/1995 | DiGiovanni et al. ........ 385/123 |
| 5,703,975 A | * | 12/1997 | Miller et al. .................. 385/16 |
| 6,282,342 B1 | * | 8/2001 | Berkey et al. ................. 385/43 |

FOREIGN PATENT DOCUMENTS

| | | |
|---|---|---|
| EP | 0 143 583 | 6/1985 |
| EP | 0 989 423 A2 | 3/2000 |
| WO | WO00/00860 | 1/2000 |
| WO | WO00/14581 | 3/2000 |

OTHER PUBLICATIONS

K. Abe, "Fluorine doped silica for optical waveguides", Communication II. 4, Proc. 2nd ECOC, Paris, France, pp. 56-61,(1976).

* cited by examiner

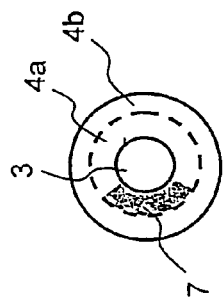
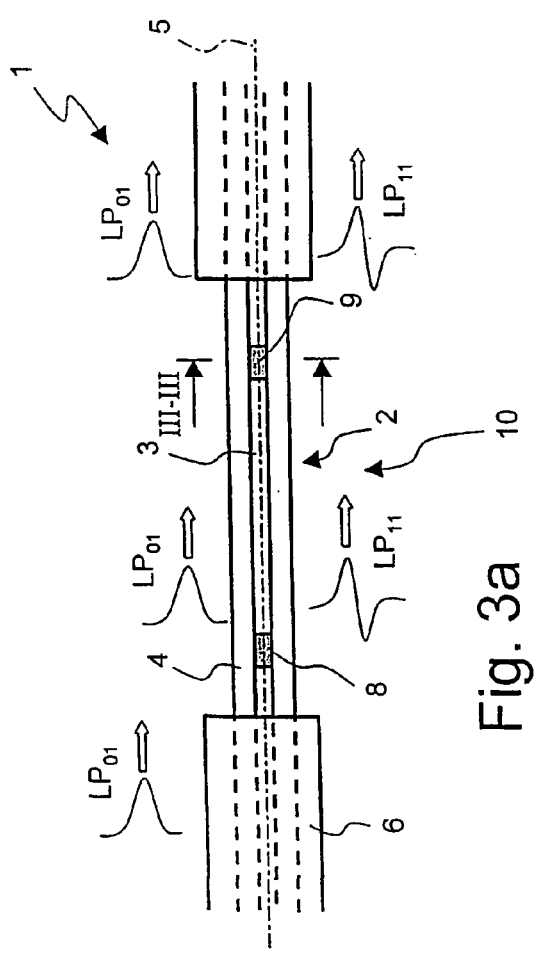
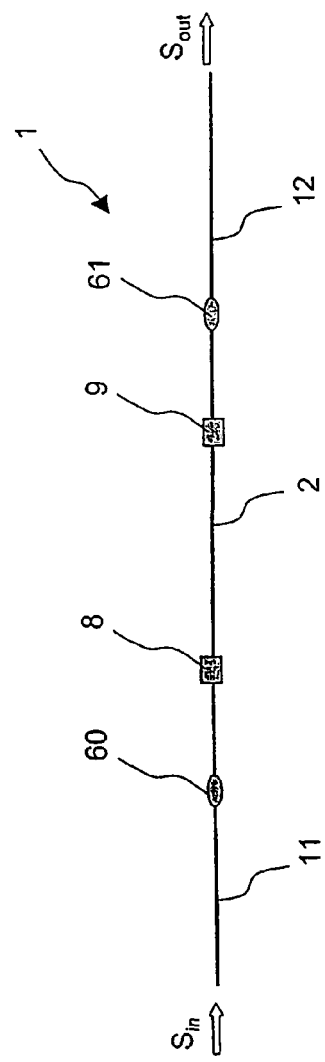

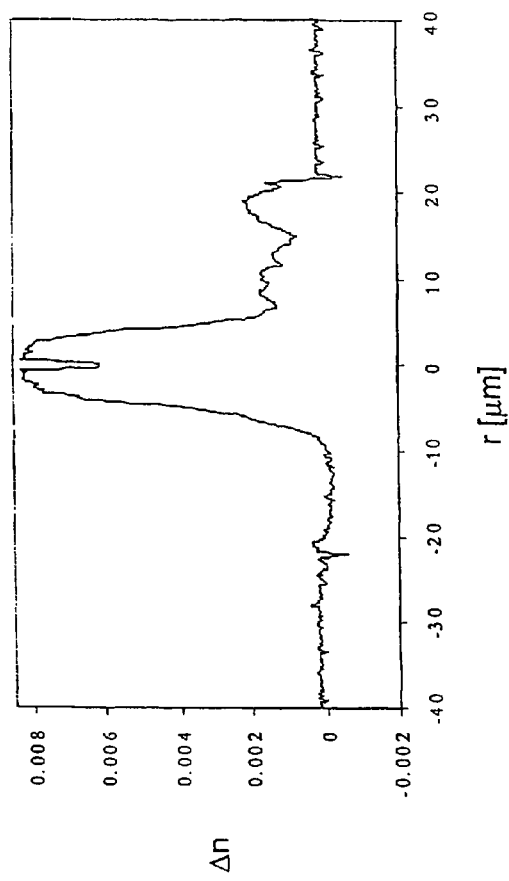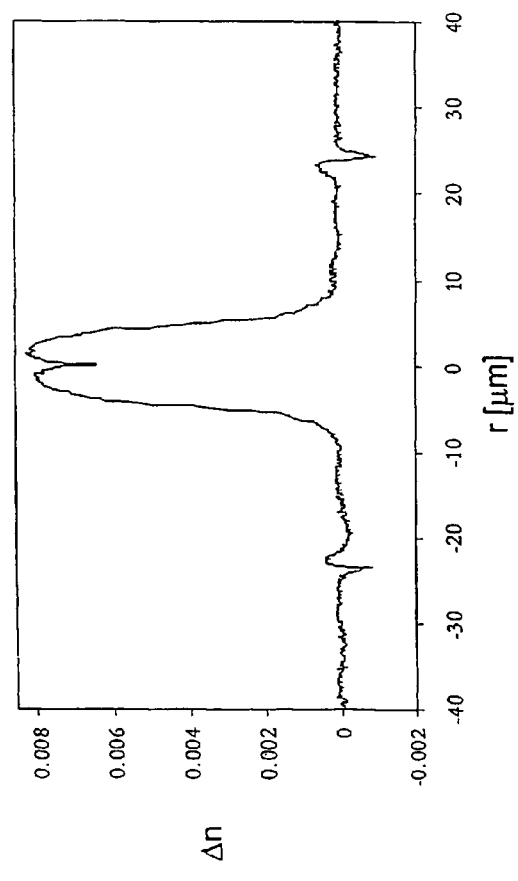

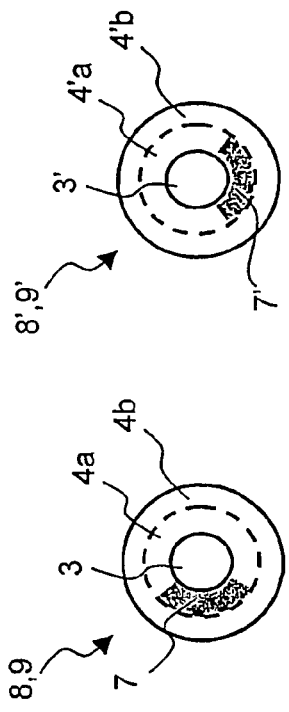
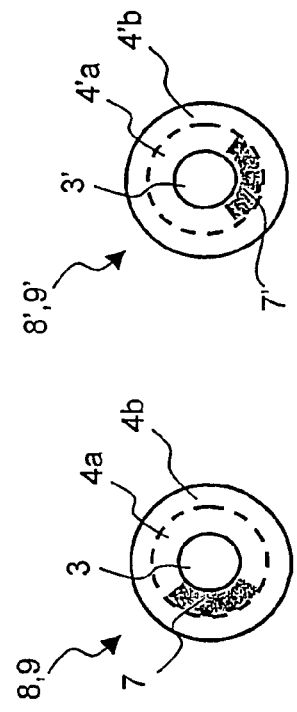
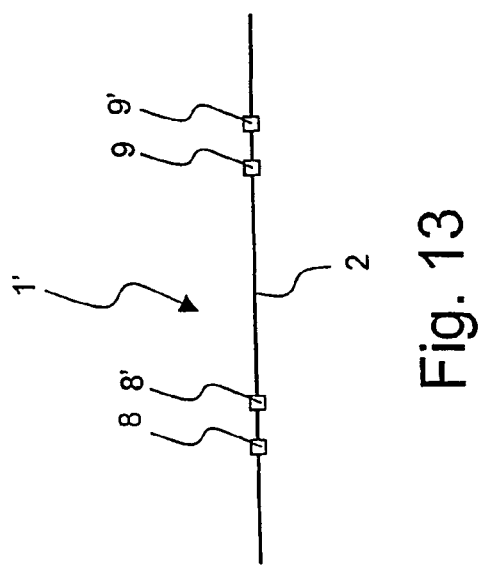
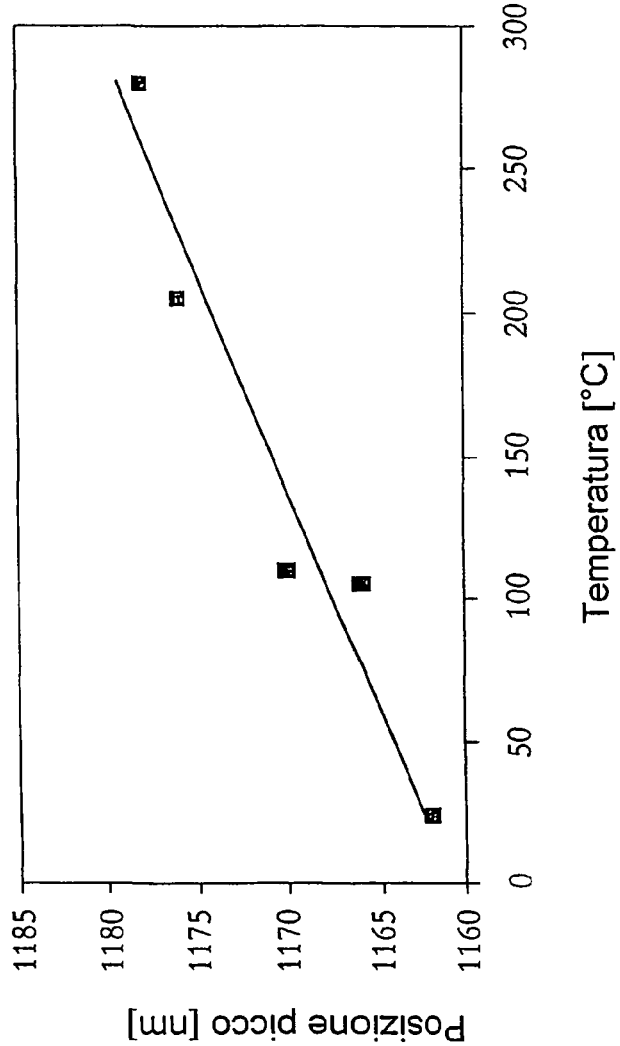

1

OPTICAL FIBER, OPTICAL FIBER FILTER, AND OPTICAL AMPLIFIER

CROSS-REFERENCE TO RELATED APPLICATIONS

This application is a national stage entry under 35 U.S.C. § 371 from International Application No. PCT/EP01/12222, filed Oct. 23, 2001, in the European Patent Office, the contents of which are relied upon and incorporated herein by reference; additionally, Applicants claim the right of priority under 35 U.S.C. § 119(a)–(d) based on patent application No. 00123718.9, filed Oct. 31, 2000, in the European Patent Office; further, Applicants claim the benefit under 35 U.S.C. § 119(e) based on prior-filed, copending provisional application No. 60/246,069, filed Nov. 7, 2000, in the U.S. Patent and Trademark Office.

BACKGROUND OF THE INVENTION

Field of the Invention

The present invention relates to an optical filtering device made from an optical fibre, in particular an optical fibre filter which can be used in a system for the transmission of wavelength division multiplexing (abbreviated "WDM") optical signals. The present invention also relates to a process for the manufacture of this filter, to an optical fibre which can be used to form this filter, to a system for the transmission of WDM signals using this filter and to a method for filtering optical signals.

Description of the Related Art

In detail, a WDM optical signal is a (digital or analogic) signal comprising a plurality of N optical signals which are independent of each other and each of which has a respective transmission wavelength $\lambda_1, \lambda_2 \ldots \lambda_N$ different from that of the other signals. Each transmission wavelength defines a transmission "channel". Moreover, each signal has, associated with it, a respective wavelength bandwidth $\Delta\lambda$ of predefined size—called a "channel bandwidth" or "channel (spectral) size"—which is centred on the corresponding transmission wavelength. The channel size depends, typically, on the characteristics of the laser sources used and on the type of modulation used in order to associate the information to be transmitted with the signal. In the absence of modulation, typical spectral amplitude values of a signal emitted by a laser source are in the region of 10 MHz, while in the case of modulation outside the range of 2.5 Gbit/s they are in the region of 5 GHz.

The WDM signal also has a "spacing between channels" defined as the wavelength (or—in an equivalent manner—frequency) separation between the central wavelengths of two adjacent channels. In order to transmit to a high number of channels in one of the so-called "transmission windows" of the optical fibres and in a useful amplification bandwidth of the optical amplifiers, the spacing between the channels of a WDM signal is, typically, in the region of one nanometre.

Generally, in a WDM system, the transmission of signals occurs in the following manner: the various signals are first generated by respective optical sources, then multiplexed so as to form a WDM signal, next transmitted along the same optical fibre transmission line and, finally, demodulated so as to be received by respective receivers.

In recent wavelength multiplexing optical amplification and transmission systems (able to transmit, along the same fibre, a very high number of channels—for example 128—distributed over a particularly wide spectral bandwidth—for example 70 nm) and, more generally, in optical signal processing apparatus, for both instrumentation and sensors, devices made entirely of optical fibre, without any propagation of the light in free space, are being increasingly used. In particular, these devices are required for the operations of spectral filtering, multiplexing and demultiplexing of the channels and separation of the transmission spectrum into bands.

With regard to spectral filtering, it is necessary to use both devices with a high wavelength selectivity for filtering of individual channels and wider-bandwidth devices for equalization of the channels in the amplification bandwidth of the optical amplifiers. Equalization of the channels is necessary since the gain spectrum of erbium-doped optical fibre amplifiers (which constitute the most widely used optical amplification means) has a significantly unequalized form in the region between 1530 and 1560 nm. Despite the progress achieved in the development of glass matrices for silica-based optical fibres containing various co-dopants able to "flatten" the spectral gain curve, at the moment silica-based fibres which have a sufficiently uniform gain profile such as not to require external equalization are not available.

The configuration most used to form wideband optical gain modules involves the use of an equalizer filter arranged between two active-fibre amplification stages. The insertion of the filter between the two amplification stages has the fundamental advantage of allowing a spectral "redistribution" of the power available for amplification, instead of simple suppression of the power in the wavelength regions with a higher gain. The spectral profile of the filter which offers maximum equalization depends on the operating conditions of the amplifier (and, therefore, on the power of the pump radiation supplied to each stage) as well as the number and the wavelength distribution of the channels. In recent systems where there is the possibility of channel addition/extraction, the number and the distribution of the channels may change depending on the configuration chosen by the system manager.

For the abovementioned reasons it has become important to have optical filters which can be efficiently integrated with the active fibre, with low insertion losses and with a spectral profile which can be easily modified depending on the specific use of the individual amplifier.

Different types of filters made directly using optical fibre are known.

A first type of filter is distinguished by the fact that the fibre has a portion with a sudden variation in diameter, i.e. a tapered portion. This region induces, in each signal passing through it, an attenuation which depends on the wavelength of the said signal. In this way, therefore, spectral filtering is performed. The spectral form of the attenuation of these filters is substantially sinusoidal on the wavelength.

Another type of filter, which is known as a "Fabry-Perot" filter, is formed by an optical fibre and two Bragg gratings formed in the fibre itself and operating as mirrors so as to define an optical resonator.

More recently so-called long period gratings (LPG) have been developed, said gratings being distinguished by periodic variations in the index profile of a fibre (typically by means of exposure to UV radiation) and also allowing wavelength filtering to be performed.

A further class of filters is that defined by an interferometric structure of the Mach-Zehnder type. Such a structure must be able to perform separation of an optical signal into two different distributions of electromagnetic field, propagate these distributions along respective optical paths into which it is possible to introduce, in a controlled manner, a mutual delay and, subsequently, combine again the two electromagnetic field distributions so as to obtain an optical interference signal, the intensity of which is a function of the wavelength.

FIG. 1 shows schematically a Mach-Zehnder filter 50 of known type, able to operate with two distinct field distributions. This interferometric structure comprises a first and a second optical fibre 51, 52 joined at two different points by means of a first and a second fusion coupler 53, 54, for example of the 50/50 (or 3 dB) type. The filter 50 is able to receive at its input a signal $S_{in}$ from a first end of the first fibre 51 and provide at its output a filtered signal $S_{out}$ to a second end of the first fibre 51. In the section between the couplers 53, 54, the fibres 51, 52 define optical paths of different length. The difference in optical path length between the two fibres 51, 52 may be due to the fact that they have different transmissive properties, so that the signals which are propagated in one fibre have a different speed from those which are propagated in the other fibre or, as shown in the figure, may be due to the fact that they have different lengths L and L+ΔL in the section considered.

The couplers 53, 54 allow power coupling between the electromagnetic fields which are propagated in the two fibres 51, 52. In particular, the function of the first coupler 53 is that of exciting two different electromagnetic field distributions in the optical fibres 51, 52 from the signal $S_{in}$. These electromagnetic fields, which are propagated along different optical paths, accumulate a relative phase difference Δφ which is not zero and defined by:

$$\Delta\phi(\lambda) = \frac{2\pi \cdot n_{eff} \cdot \Delta L}{\lambda} \quad (1)$$

where $n_{eff}$ is the effective refractive index of the mode which is propagated in the fibres, λ is the wavelength and ΔL is the difference in length between the sections of the two fibres 51, 52 comprised between the two couplers 53, 54.

The second coupler 54 is designed to combine again the two electromagnetic fields, generating an interference between them which may be constructive or destructive, depending on the phase shift Δφ accumulated.

In the simplest case where the fibres 51, 52 are identical and the couplers 53, 54 have an optical power dividing ratio equal to 50/50 (3 dB couplers), the optical powers at the two outputs of the second coupler 54, indicated respectively by $P_1$ and $P_2$, are defined by the following equations:

$$P_1 = \cos^2\left(\frac{\Pi \cdot n_{eff} \cdot \Delta L}{\lambda}\right) \quad (2)$$
$$P_2 = \sin^2\left(\frac{\Pi \cdot n_{eff} \cdot \Delta L}{\lambda}\right)$$

FIG. 2 shows the normalised transmission spectrum T(λ) of the filter 50 at the output of its first fibre 51, in the case where ΔL is equal to 5 μm and $n_{eff}$ is equal to 1.462. The period of this curve is not constant and is a function of the characteristics of the waveguides used. Having a different response for the different wavelengths, the interferometer may be advantageously used as an optical filter.

A Mach-Zehnder filter such as that described above is, however, difficult to use in practice, owing to its extreme sensitivity to external disturbances (for example variations in temperature) and variations in form (in particular variations in curvature of the fibre). These phenomena cause variations in the effective refractive index $n_{eff}$ and, therefore, in the optical path, which are generally different for the two fibres. The behaviour of this device, which is ideally described by the equations (1) and (2), therefore cannot be predicted precisely in a real situation.

In order to overcome this drawback, a solution which combines the two waveguides in a single compact structure has been proposed. The U.S. Pat. No. 5,295,205 in the name of Corning proposes a filter formed by introducing two optical fibres which are different from each other inside a glass tube, collapsing the tube onto the fibres after creating a vacuum inside the tube and, finally, heating and stretching the tube in two regions located at a distance from each other so as to form two tapered regions which define modal couplers. The fibres also have different propagation constants in the zone lying between the two couplers, resulting in a relative delay between the optical signals propagated therein.

The Applicant considers that this solution is difficult to realise on account of the technological complexity of certain steps in the production process, in particular the operations for collapsing the glass tube around the fibres after creating a vacuum in the tube and forming the couplers at a distance from each other determined on the basis of the desired spectral form and independently of the geometry of the tapered region.

An alternative method of producing a Mach-Zehnder interferometer is that described in international patent application WO00/00860 in the name of Corning. This document describes a coaxial optical device comprising an optical fibre and a coupling regulator integral with the optical fibre. The optical fibre is single-mode in the third spectral window of optical telecommunications and a glass tube with a refractive index lower than that of the cladding is collapsed onto the fibre, as described in the already mentioned U.S. Pat. No. 5,295,205. In the region where the collapsed tube is present, the refractive index profile is modified so as to allow locally the transmission of two modes, in particular the modes $LP_{01}$ and $LP_{02}$. These modes, which are mutually perpendicular by definition, define two distinct field distributions which, as they are propagated, accumulate a relative phase difference Δφ. In the region occupied by the glass tube, non-adiabatic tapered zones able to induce power coupling between the modes are formed. The tapered zones are formed by means of the normal technique for manufacturing fusion couplers, by causing sudden reductions in the diameter of the fibre and the tube collapsed onto it, such as to obtain coupling between the symmetrical modes $LP_{01}$ and $LP_{02}$, but avoid coupling with the mode $LP_{03}$.

The Applicant also notes that the device described above requires the execution of technologically complex manufacturing steps, such as collapsing of a glass tube, under vacuum, onto an optical fibre and the formation of non-adiabatic tapered zones such as to have a high value of the coupling factor between the symmetrical modes $LP_{01}$ and $LP_{02}$, but without exciting other higher symmetrical modes such as the mode $LP_{03}$ (where "coupling factor" or "splitting ratio" is understood in this case as being the ratio between the power transferred to the mode $LP_{02}$ and the remaining power in the mode $LP_{01}$).

The Applicant therefore notes that the Mach-Zehnder optical fibre filters of the known type are made using complex technology which does not allow easy control of the filter parameters. The critical nature of the manufacturing process therefore results in high costs and fairly low production outputs.

SUMMARY OF THE INVENTION

The Applicant has considered the problem of providing a Mach-Zehnder optical fibre filter which is easy to produce, compact and has a high performance.

The Applicant has found that a Mach-Zehnder interferometer which is easy and inexpensive to manufacture and has predetermined spectral characteristics may be made using a dual-mode fibre designed to allow propagation of the fundamental mode $LP_{01}$ and the asymmetrical mode $LP_{11}$ and provided with two modal coupling regions (for coupling the modes $LP_{01}$ and $LP_{11}$) in which the refractive index profile is asymmetrical due to the presence of a cladding zone with a higher refractive index. This zone defines essentially, viewed in cross section, an annular sector of the cladding in a region adjacent to the core and has a radial extension corresponding substantially to that of the mode $LP_{11}$.

The Applicant has found that a filter with coupling regions of this type may be made using an optical fibre having the innermost region of the cladding doped so as to provide it with high thermo-refractive properties and by thermally stressing this region so as to produce the desired asymmetrical and localised variation in the index profile. This doping may be performed with germanium, phosphorus and fluorine and must be such that the fibre is able to respond to a thermal stress of suitable intensity with a variation in the refractive index greater than $5 \cdot 10^{-4}$, preferably greater than or equal to $10^{-3}$, more preferably greater than or equal to $2 \cdot 10^{-3}$.

The Applicant has also found that the thermal stressing may be performed by means of the electric arc of a fusion jointer. The Applicant has found that this technique is particularly simple and flexible and may be used to produce very localised disturbances in the cross section of the optical fibre.

According to a first aspect, the present invention relates to an optical fibre filter comprising:

- an optical fibre which includes a core and a cladding and through which an optical signal can pass;
- a pair of coupling regions formed in said optical fibre at a predefined mutual distance, for producing a power transfer between a first and a second propagation mode of said optical signal;
- a phase shift region, defined by a section of said fibre lying between said coupling regions, for producing a phase shift between said first and said second propagation modes;
- in which, in said coupling regions, said optical fibre has, in cross section, an asymmetrical refractive index profile.

Preferably, in each of said coupling regions, said cladding has, in cross section, an annular sector in which the refractive index is greater than that of the remainder of said cladding.

The cladding has, in cross section, an inner annular region adjacent to the core and an outer annular region, said annular sector preferably belonging to said inner annular region.

The annular sectors of said coupling regions preferably have substantially the same angular position.

The inner annular region has an internal radius $r_1$ and an external radius $r_2 = k \cdot r_1$, in which k is preferably between 2 and 6.

Outside of said coupling regions, said optical fibre has, in cross section, a refractive index profile preferably of the step index type.

Said optical signal has a wavelength comprised in a predefined transmission wavelength band and said optical fibre is preferably dual-mode in said wavelength band.

Moreover, the filter comprises a first and a second optical connection fibres which are single-mode in said wavelength band and connected to opposite ends of said optical fibre.

Advantageously, the inner annular region comprises silica and oxides of the following elements: germanium, phosphorus and fluorine.

The filter preferably comprises a further pair of coupling regions formed in said optical fibre, in each of which said cladding has, in cross section, a further annular sector in which the refractive index is greater than that of the remainder of said cladding, said further annular sectors having substantially the same angular position, different from that of said angular sectors.

Preferably, each coupling region of said further pair of coupling regions is formed in the vicinity of a respective coupling region of said pair of coupling regions.

Advantageously, the difference between the refractive index in said annular sector and the refractive index of the remainder of said cladding is equal to at least $5 \cdot 10^{-4}$ and, more preferably, is equal to at least $2 \cdot 10^{-3}$.

The filter according to the present invention may comprise a plurality of filters as defined above, connected in series.

According to a further aspect, the present invention relates to an optical fibre which can be used for producing a filter as defined above, comprising a core and a cladding, the cladding having a radially inner region adjacent to the core and a radially outer region, in which said radially inner region has a composition such as to obtain a variation in refractive index equal to at least $5 \cdot 10^{-4}$ following thermal stressing and in which said optical fibre is dual-mode in a wavelength band lying between 1500 nm and 1650 nm. Preferably, said variation in refractive index is equal to at least $1 \cdot 10^{-3}$ and, more preferably, is equal to at least $2 \cdot 10^{-3}$.

The difference $n_2 - n_3$ between the refractive index $n_2$ in said radially inner region and the refractive index $n_3$ in said radially outer region is preferably between $+1 \cdot 10^{-3}$ and $-2 \cdot 10^{-3}$.

Said radially inner region preferably comprises silica and oxides of the following elements: germanium, phosphorus and fluorine. Advantageously, in said radially inner region, the germanium has a concentration of between 2% and 5%, the phosphorus has a concentration of between 0.5% and 2% and the fluorine has a concentration of between 1% and 2%.

Preferably, the core comprises silica and at least one element selected from germanium and phosphorus.

Preferably, the fibre is dual-mode in a wavelength band of between 1500 nm and 1650 nm.

Said inner annular region has an internal radius $r_1$ and an external radius $r_2 = k \cdot r_1$, in which k is preferably between 2 and 6.

According to another aspect, the present invention relates to a process for the production of an optical filter from an optical fibre as defined above, comprising the step of applying an electric arc to a first and a second portions of said optical fibre in such a way as to stress the cladding of said optical fibre thermally in an asymmetrical manner.

Advantageously, said electric arc is generated between a pair of electrodes and the process comprises the step of displacing said optical fibre in a controlled manner relative to said electrodes after applying the electric arc to said first portion and before applying the electric arc to said second portion.

Said electric arc has a duration preferably less than 400 ms, and more preferably less than 300 ms, and has a current intensity preferably of between 8 and 14 mA and more preferably between 10 and 11 mA.

In order to disturb thermally said first portion and said second portion, instead of applying a single arc, a plurality of electric arcs may be applied in succession.

According to a further aspect, the present invention relates to an optical amplifier comprising at least one optical amplification stage and an optical filter as defined above, arranged in series with said optical amplification stage.

According to a further aspect, the present invention relates to an optical telecommunications system comprising at least one optical transmitter, at least one optical receiver, an optical transmission line connecting said transmitter to said receiver and at least one optical amplifier arranged along said transmission line, in which said optical amplifier comprises at least one optical amplification stage and an optical filter as defined above, arranged in series with said optical amplification stage.

Preferably, said optical amplifier comprises two optical amplification stages and said optical filter is arranged between said two stages. Alternatively, said optical filter is arranged downstream of said two stages.

According to a further aspect, the present invention relates to an optical-fibre modal coupler comprising:
    an optical fibre which comprises a core and a cladding and through which an optical signal can pass; and
    a coupling region formed in said optical fibre for producing a power transfer between a first and a second propagation mode of said optical signal;
    in which said optical fibre has, in cross section, an asymmetrical refractive index profile in said coupling region.

According to a further aspect, the present invention relates to a method for filtering an optical signal, said optical signal being transmitted in a waveguide in the fundamental mode $LP_{01}$, the method comprising the steps of:
    transmitting said signal through a first waveguide region having, in cross section, an asymmetrical refractive index profile so as to transfer power from the fundamental mode $LP_{01}$ to the asymmetrical mode $LP_{11}$;
    conveying said fundamental mode $LP_{01}$ and said asymmetrical mode $LP_{11}$ over a predefined distance so as to produce a relative phase shift depending on said distance and the wavelength;
    transmitting said fundamental mode $LP_{01}$ and said asymmetrical mode $LP_{11}$ through a second waveguide region having, in cross section, an asymmetrical refractive index profile, so as to couple power between the fundamental mode $LP_{01}$ and the asymmetrical mode $LP_{11}$.

BRIEF DESCRIPTION OF THE DRAWINGS

Further details may be obtained from the following description which refers to the accompanying figures listed below:

FIG. 3a shows a schematic and partial view of a Mach-Zehnder filter produced in accordance with the invention;

FIG. 3b shows a cross section through line III—III of the filter of FIG. 3a;

FIG. 3c shows an overall schematic view of the filter according to the invention;

FIGS. 7a and 7b show respectively the refractive index profile of the fibre of the filter according to the invention in a section thermally disturbed by the process step according to FIG. 6 and in a section not disturbed thermally;

FIG. 13 shows a different embodiment of the filter according to the invention;

FIGS. 14a and 14b show by way of example the asymmetrical variations in the index profile in different coupling regions of the filter according to FIG. 13;

FIG. 15 shows the result of a measurement of the dependency of the filter spectrum on the temperature;

DETAILED DESCRIPTION OF THE EMBODIMENTS

Figure 1:
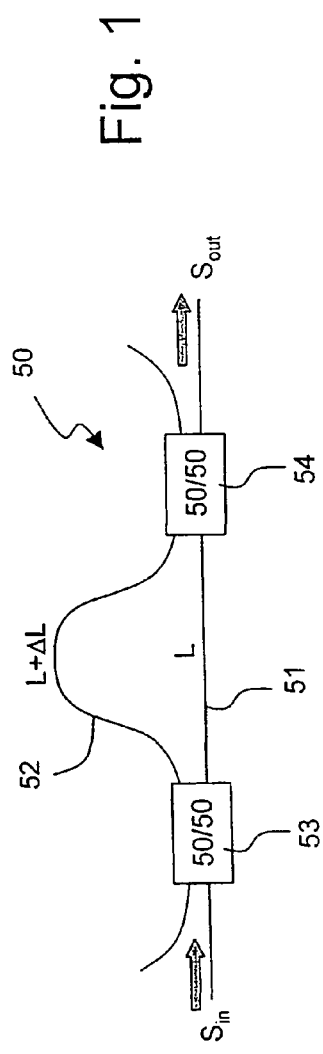
FIG. 1 shows in schematic form a Mach-Zehnder filter of known type.
Figure 2:
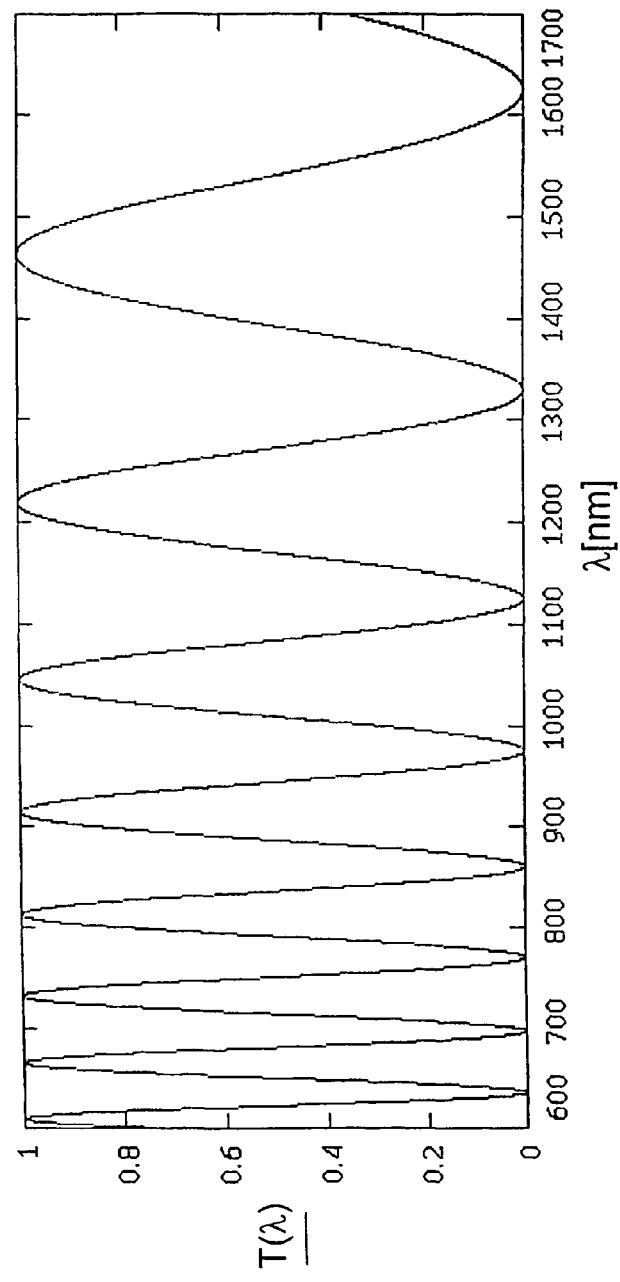
FIG. 2 shows the transmission spectrum of the filter according to FIG. 1.

With reference to FIG. 3a, 1 denotes a fibre optical filter of the Mach-Zehnder type. The filter 1 includes a dual-mode optical fibre 2 which has a length preferably of between 1 mm and 100 mm and comprises a core 3 and a cladding 4, both having the same longitudinal axis 5. The fibre 2 also has a superficial protective coating 6 consisting of polymer material. The coating 6 is partially removed during the process for formation of the filter 1 (as shown in the figure) and if necessary may be reapplied at a later stage.

The core 3 has a radius $r_1$ and a refractive index $n_1$ and is composed of silica ($SiO_2$) doped with one or more elements which have the effect of raising the refractive index, such as, for example, germanium (Ge) and phosphorus (P). As shown in FIG. 3b, the cladding 4 comprises an inner region 4a and an outer region 4b, both of which are annular in cross section. The inner region 4a borders with the core 3 (and therefore has an internal radius equal to $r_1$), has a refractive index $n_2$ and has an external radius $r_2$ equal to $k \cdot r_1$, where k is a suitable coefficient, preferably between 2 and 6. Moreover, $r_1$ is preferably between 2.5 and 6.5 μm. The outer region 4b has a refractive index $n_3$ and an external radius $r_3$ preferably equal to 62.5 μm.

Figure 4:
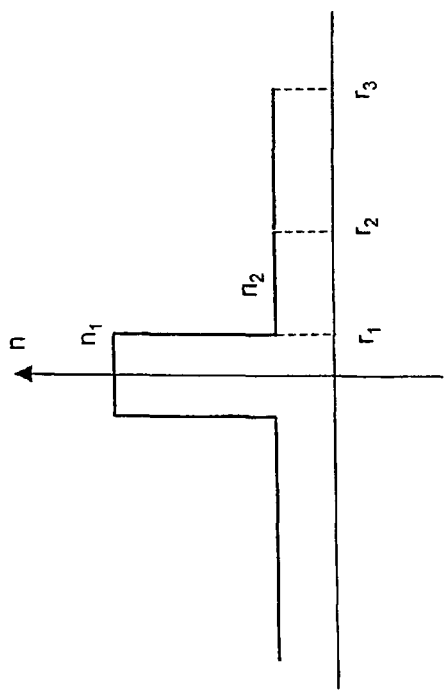
FIG. 4 shows the refractive index profile of an optical fibre which can be used in order to produce the filter according to FIG. 3.

Preferably, the difference $n_1-n_2$ between the refractive indices of the core 3 and the inner region 4a lies between $3.4 \cdot 10^{-3}$ and $1.5 \cdot 10^{-2}$. Moreover, the difference $n_2-n_3$ between the refractive indices of the inner region 4a and the outer region 4b is preferably between $+1 \cdot 10^{-3}$ and $-2 \cdot 10^{-3}$. More preferably, $n_2$ is substantially equal to $n_3$ and the fibre 2 therefore has a refractive index profile substantially in the form of a step (step index), as shown in FIG. 4.

As is known, in the case of a fibre with a refractive step index profile the cut-off wavelength $\lambda_c$ is determined solely by the radius $r_1$ of the core 2 and the numerical aperture NA. In the present case, the radius $r_1$ and the numerical aperture NA are chosen so that the fibre 2 is dual-mode in the spectral region currently of greatest interest for optical telecommunications, i.e. between 1500 nm and 1650 nm.

Since the fibre 2 must be able to communicate with single-mode fibres with known characteristics, it may be designed with a refractive step index $n_1$–$n_2$ and with a radius $r_1$ such as to have a distribution of the fundamental mode substantially equivalent to that in the single-mode fibres considered. In this way, power transfer of only the fundamental mode is ensured between the fibre 2 and these single-mode fibres.

The inner region 4a has a composition such that it is thermo-refractive. This composition comprises silica (Si), germanium (Ge), phosphorus (P) and fluorine (F). The Applicant has ascertained that, with this composition, it is possible to obtain, using the thermal disturbance technique described below, a variation in the refractive index equal to at least $5 \cdot 10^{-4}$. Advantageously, the variation in the refractive index thus obtained may be greater than or equal to $1 \cdot 10^{-3}$, even more advantageously greater than or equal to $2 \cdot 10^{-3}$.

The Applicant has found that, in order to obtain an inner region 4a with the abovementioned refractive index value and with the abovementioned thermo-refractivity characteristics, the concentrations of the abovementioned dopants in this region must lie within the following ranges:

Ge: between 2% and 5%
P: between 0.5% and 2%
F: between 1% and 2%

Still with reference to FIG. 3a, the fibre 2 has a first and a second modal coupling regions 8, 9 positioned at a distance L from each other along the axis 5. The modal coupling regions 8, 9 are formed by inducing thermally, using the method described below, a variation in the refractive index $\Delta n$ which is asymmetrical in the inner region 4a. In practice, as shown in FIG. 3b, a portion 7 (shown shaded in grey) of the inner region 4a, defining a substantially annular sector in cross section, has a refractive index greater than that of the remainder of the cladding cross section.

Owing to the presence, inside an optical fibre, of a zone with a very asymmetrical refractive index profile, it is possible to achieve strong power coupling between the fundamental mode $LP_{01}$ and the asymmetrical mode $LP_{11}$. Each of the modal coupling regions 8, 9 therefore defines, together with the fibre 2, a modal coupler. Preferably, the variation in the index must be of a form (in the section considered) very similar to that of the mode $LP_{11}$.

The section of fibre 2 lying between the two coupling regions 8, 9—denoted by 10—is referred to below as the "phase shift region" since it defines the region in which the modes $LP_{01}$ and $LP_{11}$ undergo a mutual phase shift $\Delta \phi$ which is a function of the wavelength. The filter 1 therefore defines two coupling regions 8, 9 and a phase-shift region 10 lying between them.

Furthermore, as shown in the schematic illustration in FIG. 3c, the filter 1 comprises a first and a second fibres 11, 12 of the standard single-mode (SM) type, which are connected by means of respective joints at the opposite ends of the fibre 2, so as to allow a substantially loss-free coupling with the single-mode transmission fibres of the system in which the filter 1 is placed. The fibres 11, 12 are single-mode in a spectral band lying between 1500 nm and 1650 nm. The filters 11, 12 define, respectively, an input for single-mode signals $S_{in}$ to be filtered and an output for the filtered single-mode signals $S_{out}$. The fibres 11, 12 have geometric characteristics such that they have a profile of the fundamental mode the same as that of the fibre 2, so as to minimise the coupling losses therewith and perform modal filtering in order to eliminate the mode $LP_{11}$. The fibres 11, 12 preferably have a numerical aperture NA of between 0.1 and 0.2 and an external radius (of the cladding) equal to about 62.5 µm.

The operation of the filter 1 is described below. When a single-mode optical input signal $S_{in}$ reaches, via the first single-mode fibre 11, the first coupling region 8, a transfer of power occurs from the mode $LP_{01}$ to the mode $LP_{11}$ in a quantity dependent on the wavelength. Subsequently, the modes $LP_{01}$ and $LP_{11}$ are propagated in the phase shift region 10, at the end of which they have a phase difference $\Delta \phi$ expressed by the following relation:

$$\Delta \phi = \frac{2\pi}{\lambda} \cdot \Delta n_{\text{eff}} \cdot L \quad (3)$$

where $\Delta n_{\text{eff}}$ is the difference between the effective refractive indices of the mode $LP_{01}$ and the mode $LP_{11}$ and $\lambda$ is the wavelength.

This phase difference is due to the different optical paths followed by the modes $LP_{01}$ and $LP_{11}$ owing to their different effective refractive indices $n_{\text{eff}}$ and, therefore, to their different speeds of propagation within the phase shift region 10. When the two modes $LP_{01}$ and $LP_{11}$ reach the second modal coupling region 9, they are combined again, interfering constructively or destructively depending on the wavelength considered. The outgoing signal from the second modal coupling region is further filtered upon entering into the second single-mode fibre 12, with elimination of the mode $LP_{11}$. A single-mode signal $S_{out}$ with a spectral form depending on the spectral response of the filter 1 is therefore output from the fibre 12.

The process for manufacturing the filter 1 is described below.

The optical fibre 2 is made using the technique of modified chemical vapour deposition (MCVD). In this process, in order to obtain the desired composition in the thermo-refractive inner region 4a, then, in addition to the oxygen and silicon tetrachloride ($SiCl_4$) which are typically used in this process, germanium tetrachloride ($GeCl_4$), phosphorus oxychloride ($POCl_3$) and one of the following compounds of fluorine: Freon ($CCl_2F_2$), sulphur hexafluoride ($SF_6$) and silicon tetrafluoride ($SiF_4$), are also introduced into the deposition tube.

The coupling regions 8, 9 are then formed on the optical fibre 2. The Applicant has found that the coupling regions 8, 9 may be formed by applying, to the fibre 2, an asymmetrical thermal disturbance able to produce the desired variation in the refractive index profile in the inner region 4a of the cladding 4. The Applicant has also found that this thermal disturbance may be produced by means of an electric arc.

Figure 5:
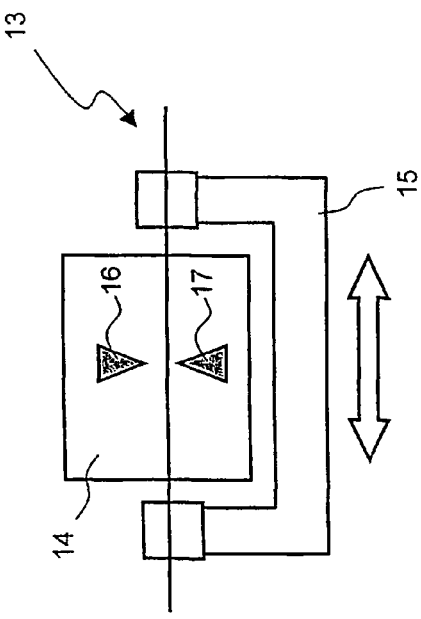
FIG. 5 shows in schematic form an apparatus for forming the modal coupling regions of the filter according to the invention.

With reference to FIG. 5, 13 denotes an apparatus for forming the coupling regions, comprising a fusion jointer 14 of known type, for example a Fujikura model FSM-20CSII fusion jointer for optical fibres, and a fibre moving device 15, able to perform micrometric displacements of the fibre 2 parallel to its axis.

Figure 6:
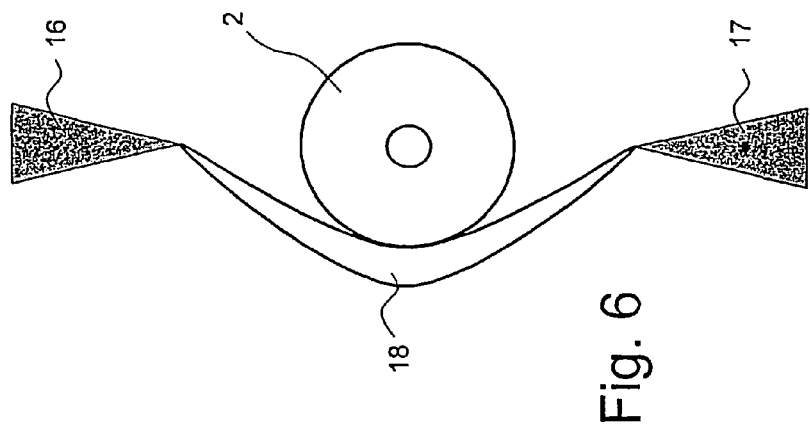
FIG. 6 shows in schematic form a step in the process for the production of the filter according to FIG. 3a, in which a predefined section of optical fibre is struck by the electric arc of a fusion jointer.

In order to induce an asymmetrical thermal disturbance, the fibre 2 is positioned between the electrodes of the jointer 14, indicated by 16, 17, as shown in FIG. 6.

The jointer 14 is then activated so as to produce an electric arc 18 which causes sudden heating of the fibre 2 and, after the discharge, subsequent rapid cooling thereof. Since the position of the fibre 2 is never perfectly symmetrical with respect to the electrodes 16, 17, the electric arc 18 is usually formed only on one side of the section of the fibre 2, as shown in the Figure. There is therefore a temperature distribution inside the fibre 2 such as to cause an asymmetrical variation in the refractive index $\Delta n$. This behaviour of the electric arc 18 may be observed, for example, by positioning a videocamera (not shown) close to the electrodes 16, 17 of the jointer 14.

In order to form the other coupling region, the fibre 2 must be displaced parallel to its axis 4 by means of the fibre moving device 15 so as to arrange, between the electrodes 16, 17, a different portion of fibre 2, the distance of which from the previously treated portion is exactly equal to L, and apply again the electric arc to this portion.

The Applicant has manufactured, in order to carry out some experimental measurements described below, a fibre 2 with the following characteristics:

$r_1$ equal to 4.7 µm;
$k(=r_2/r_1)$ equal to 4.3;
$n_2=n_3$;
numerical aperture NA equal to 0.15;
cut-off wavelength $\lambda_c$ equal to 1630 nm;
inner region 4a comprising (by scanning electron microscope (SEM) analysis): 95.2% silica (Si), 4% germanium (Ge), 0.8% phosphorus (P). The percentage of fluorine (F), which cannot be determined using the SEM technique, was estimated at about 1.3% using the teaching of K. Abe, European Conference on Optical Fiber Communication, Paris, 1996, Presentation II.4, taking into account that this concentration allows to achieve the same refraction index value in the inner region 4a and in the outer region 4b.

From this fibre, a filter 1 with the following additional characteristics was produced:

distance L between the coupling regions 8 and 9: 30 mm;
numerical aperture of the fibres 11, 12: 0.12;
cut-off length of the fibres 11, 12: 1200 nm;
external radius of the cladding of the fibres 11, 12: 62.5 µm.

FIGS. 7a and 7b show, respectively, the refractive index profile of the fibre thus obtained in the thermally disturbed section and in a section which is not thermally disturbed. From FIG. 7a it can be seen that the variation $\Delta n$ in the refractive index profile is asymmetrical in the section of the fibre 2 and has a maximum value of about $2 \cdot 10^{-3}$.

Figure 8:
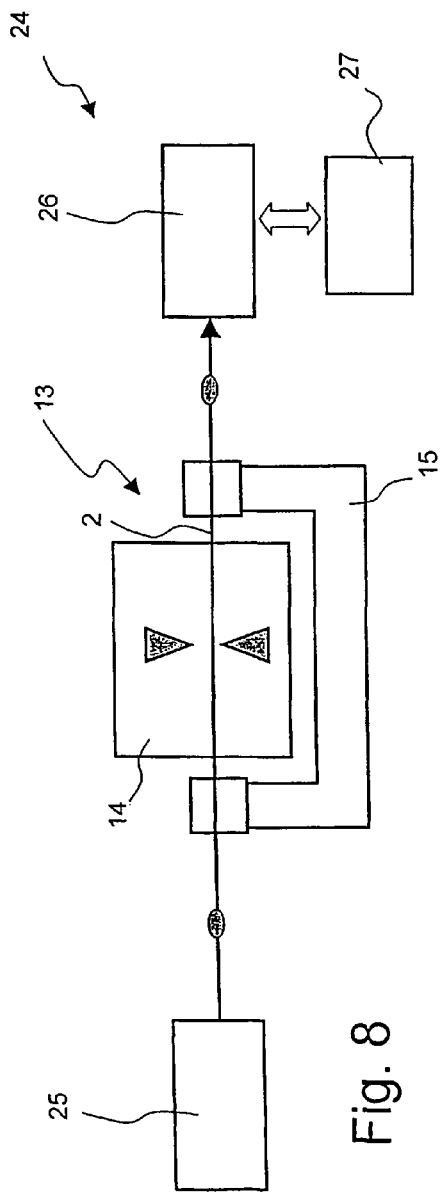
FIG. 8 shows an apparatus which can be used for monitoring the coupling characteristics of the filter during formation of the modal coupling regions.

The characteristics of the coupling regions 8, 9 are determined by the power and the duration of the electric arc 18. The Applicant has noted that it is not possible to establish precisely, on the basis of the parameters of the electric arc 18, the amount of the variation in the index profile and, therefore, the coupling factor. In order to verify the coupling properties of the regions 8, 9, it is possible to perform monitoring, during the writing process, of the extinction ratio of the filter (which is correlated to the coupling factor), by means of a spectral analysis. FIG. 8 shows an apparatus 24 which can be used for monitoring the coupling characteristics of the filter during the formation of the coupling regions 8, 9. The apparatus 24 comprises a white light source 25 able to supply wide-spectrum electromagnetic radiation to the fibre 2, a spectrum analyser 26 able to analyse the spectrum of the light leaving the fibre 2, and a processing unit 27 connected to the spectrum analyser 26 for processing information supplied by the said analyser.

Figure 9:
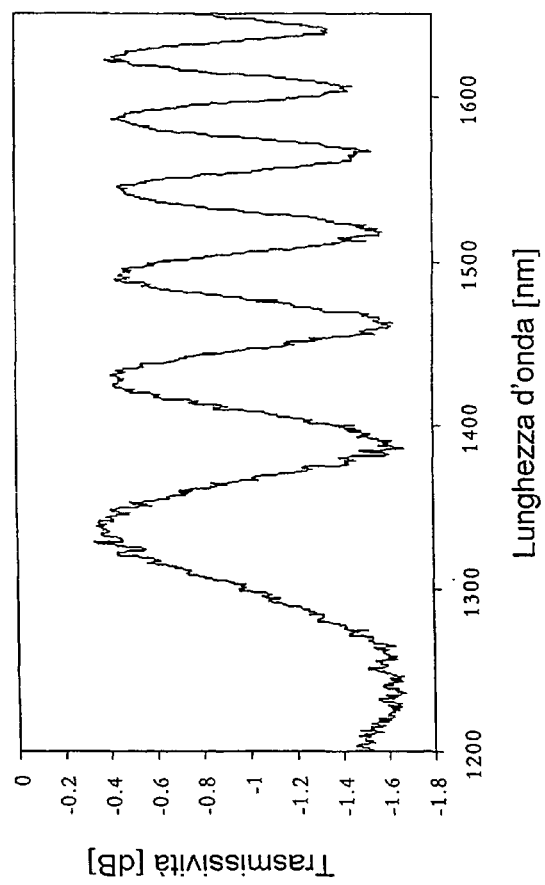
FIG. 9 shows the transmission spectrum, obtained by means of the apparatus according to FIG. 8, of a filter produced in accordance with the invention.

FIG. 9 shows the transmission spectrum, obtained by means of the apparatus 24, of a filter 1 with the characteristics described above. From this figure it is possible to note that the spectral form of a filter produced in accordance with the invention is that typical of the interferential filters of the Mach-Zehnder type, i.e. is periodic with a periodicity depending on the wavelength considered. The extinction ratio thus obtained (namely the difference between the minimum and maximum transmissivity of the filter expressed in dB) is equal to about 1.2 dB and the insertion losses are equal to about 0.4 dB. The Applicant has also noted that, by optimising the process parameters, it is possible to obtain an extinction ratio greater than 2.5 dB.

On the basis of the desired spectral response, the optical filtering device according to the present invention may comprise, in a manner not shown, several filtering stages arranged in cascade. In other words, this device may comprise a plurality of filters 1 which are connected in series so as to have a spectral response determined by the combination of the responses of the various filters. As known from the text "Fiber Optic Networks", Prentice Hall, P. E. Green, 1993, page 123, in order to design a Mach-Zehnder filter with a desired spectral behaviour, it is necessary to know the dispersion characteristic of the modes which are propagated along the fibre, namely the value $\Delta\beta$ ($\lambda$) of the difference between the propagation constants of the interfering modes. The modal dispersion characteristic may be obtained by means of regression or "fitting" of the spectral response (for example that shown in FIG. 9) of a test filter of known length. From this dispersion characteristic, it is possible, by means of digital simulation, to determine the parameters of the interferometer, in particular the distance L (or the distances L between the coupling points, in the case of several interferometers arranged in cascade) and the values of the coupling coefficients, which are required in order to produce the filter with the desired spectral response.

Figure 10:
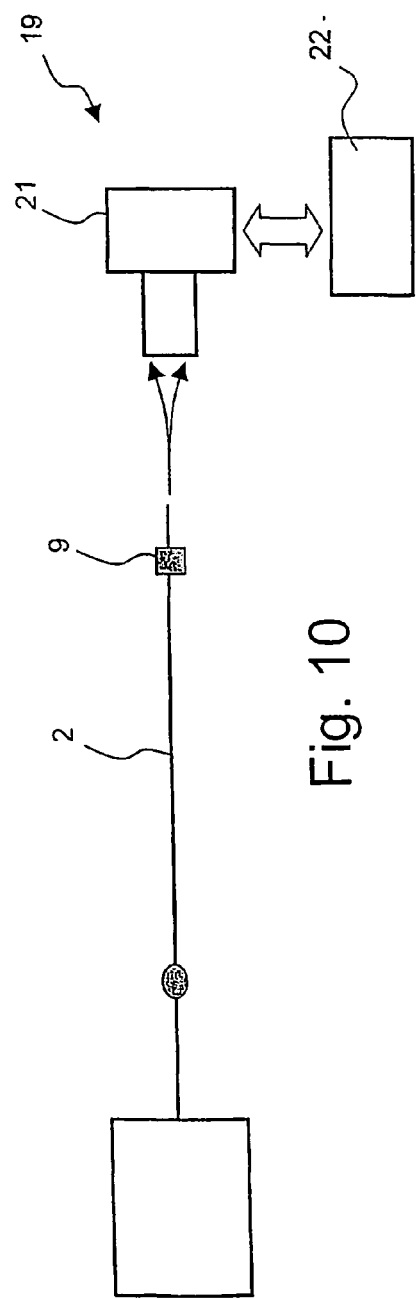
FIG. 10 shows schematically an experimental apparatus for measuring the modal coupling due to the asymmetrical variation in the refractive index profile of the fibre.

The efficiency with which the asymmetrical variation in the index profile obtained using the technique according to the invention induces coupling in the higher asymmetrical mode $LP_{11}$ may be verified by means of a suitable experimental test. For this purpose it is possible to use a measuring apparatus such as that shown in FIG. 10 and indicated therein by 19.

The measuring apparatus 19 comprises a laser source 20 able to supply to one of the ends of the fibre 2 a laser beam at the wavelength of 1550 nm and a infrared videocamera 21 positioned so as to be able to detect the light emitted from the fibre. In particular, the camera 21 is able to detect the intensity profile of the electromagnetic field (known as "near field") emitted from the fibre 2. The measuring apparatus 19 also comprises a processing unit 22 connected to the camera 21 so as to receive from it a digital signal correlated with the optical signal detected.

The intensity profile of the electromagnetic field detected by the camera 21 is formed by the superimposition of the modes which are propagated in the fibre 2 and, in mathematical terms, is defined by the square of the linear combination of these modes. Each mode also has, associated with it, a multiplication coefficient which determines its amplitude and, therefore, its weight within the linear combination. In order to derive these coefficients it is possible to perform a linear regression (or fitting) operation on the result of the experimental measurement. In practice, based on the distribution of the fibre modes ($LP_{01}$, $LP_{11}$, etc.), these modes are combined so as to obtain the intensity of the resultant field which best approximates that measured.

Figure 11A:
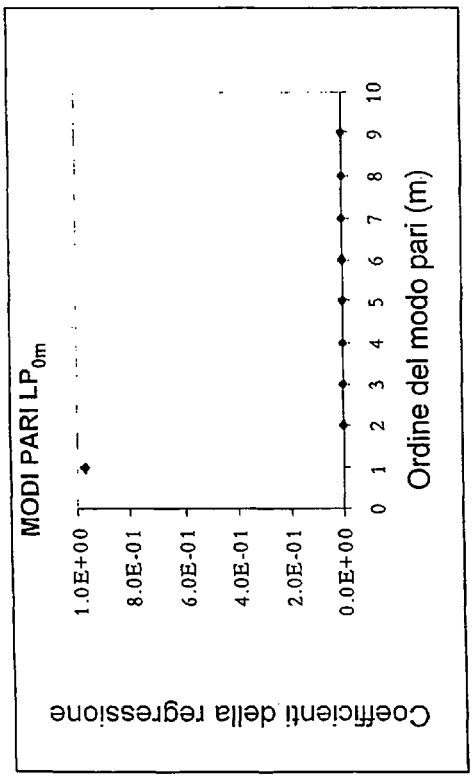
FIGS. 11a and 11b show the results of a measurement carried out with the apparatus according to FIG. 10, following a regression (fitting) operation.
Figure 11B:
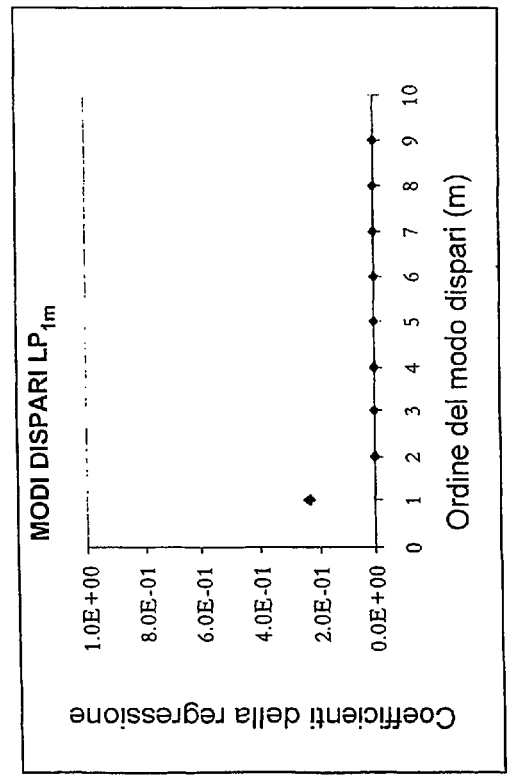

The Applicant carried out a test using a fibre 2 having the characteristics described above and provided with the coupling regions 8 and 9. FIGS. 11a and 11b show the linear regression (fitting) coefficients, the first for the even modes (of the type $LP_{0m}$) and the second for the odd modes (of the type $LP_{1m}$) obtained from the analysis of the fibre 2. These graphs confirm that the only modes involved in the coupling are the modes $LP_{01}$ and $LP_{11}$. In the case in question, the values of the coefficients associated with the modes $LP_{01}$ and $LP_{11}$ are equal to 0.79 and 0.21 respectively. This measurement therefore confirms that the coupling induced by means of the asymmetrical variation in the index profile produces a high modal selectivity, resulting in a practically negligible contribution of modes other than the modes $LP_{01}$ and $LP_{11}$.

The Applicant has also noted that the coupling factor, defined as being the ratio between the power transferred to the mode $LP_{11}$ and that remaining in the mode $LP_{01}$, increases with the intensity (in other words with the amperage) of the electric arc. However, the Applicant has also noted that if this intensity is too high, a geometric deformation of the fibre is induced, in addition to a variation $\Delta n$ in the refractive index in the fibre. This deformation causes power losses which involve an increase in the insertion losses of the filter and, therefore, a deterioration in the performance of the said filter. It is therefore necessary to achieve a compromise between the desired coupling factor (and therefore the desired extinction) and the resultant insertion losses. The Applicant has ascertained that the electric arc must have a duration preferably of less than 400 ms, more preferably less than 300 ms, and a current intensity preferably between 8 and 14 mA, more preferably between 10 and 11 mA. More preferably, instead of a single arc, a sequence of arcs with the abovementioned characteristics may be applied.

Figure 12:
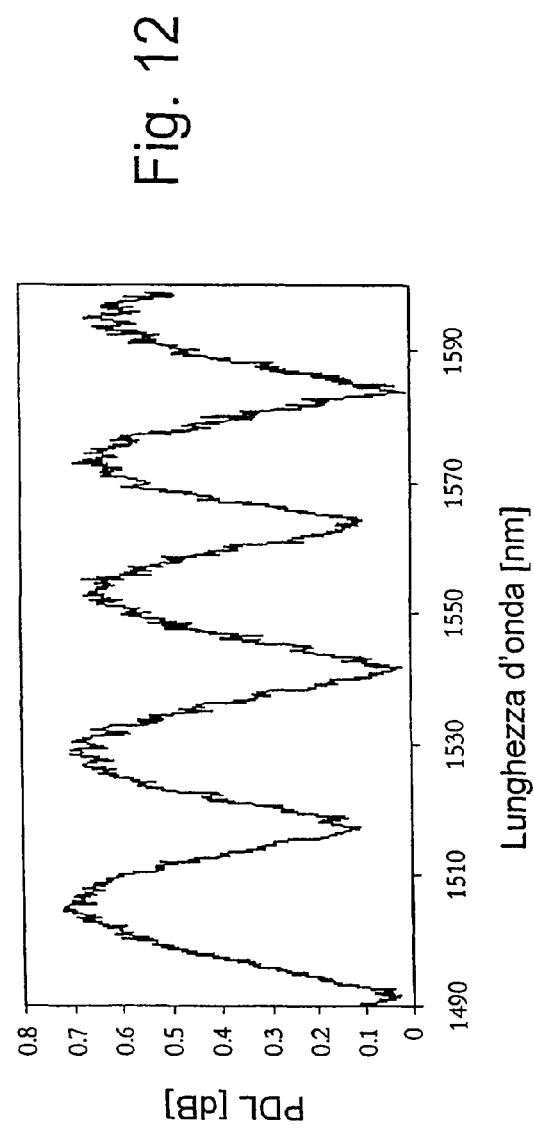
FIG. 12 shows a measurement of the losses of the filter according to the invention, due to polarisation of the input signal.

The Applicant also noted that, since the index profile variation which causes coupling does not have a circular symmetry, the coupling factor varies in accordance with polarisation of the light. The operation of the filter 1 therefore depends on the polarisation of the incoming light. This dependency is measured by evaluating, for each wavelength, the maximum variation which exists in the attenuation spectrum of the filter with variation in the polarisation (PDL, Polarisation Dependent Loss). FIG. 12 shows the PDL measured, using a known technique, on a filter 1 which has the characteristics described above. The mean value of the measured PDL is about 0.4 dB, for a filter with an extinction ratio of about 2.6 dB.

The Applicant notes that this dependency on the polarisation may be disadvantageous when the filter 1 is used in an amplification stage.

FIG. 13 shows schematically a variation of the filter according to the invention—denoted by 1'—able to reduce significantly the abovementioned problem. The filter 1' differs from the filter 1 in that two further coupling regions 8' and 9' are present, preferably at a distance from each other equal to L. The coupling regions 8' and 9' differ from the coupling regions 8, 9 in that the former have an asymmetrical variation in the index profile which is perpendicular to that of the latter. In particular the coupling regions 8' and 9' have, in cross section, an annular sector 7' which is rotated through a right angle (90°) with respect to the annular sector 7 of the coupling regions 8 and 9. FIGS. 14a and 14b show, by way of example, the asymmetrical variations in the index profile in the coupling regions 8 and 8', respectively (similar to those present in the regions 9 and 9', respectively). The mutual distance between the coupling regions 8 and 8' and between the coupling regions 9 and 9' is preferably the same, for example 100 μm. Since this distance is very small, the undesirable effects of modulation of the signal due to the presence of the additional coupling regions 8' and 9' is negligible.

As before, it is possible to produce an optical filtering device comprising, in a manner not shown, a plurality of filters 1' connected in series.

The Applicant has also noted that the operation of the filter 1 depends on the operating temperature. In particular, with a variation in the temperature, the peaks in the spectral response of the filter 1 are displaced in terms of wavelength. In order to verify the sensitivity to temperature of the filter according to the present invention, a filter 1 with the characteristics indicated above was positioned in a controlled-temperature chamber, in which the temperature was varied (for example with a ramp-like variation) so as to cause the displacement, in wavelength, of its resonance peaks. FIG. 15 shows the results of this measurement. In particular, the points measured and a regression (fitting) line for a filter with a distance L of 20 mm are shown. It was found that, for each millimetre of length of the filter, the position of the peak in the spectrum varies by about 0.0016 nm for each degree centigrade of variation in the temperature. The Applicant notes that this dependency is substantially equivalent to that demonstrated by other interferential filters of the Mach-Zehnder type.

The filter according to the present invention may be advantageously used in a long-distance WDM (Wavelength Division Multiplexing) telecommunications system, for example an undersea telecommunications system.

Figure 16:
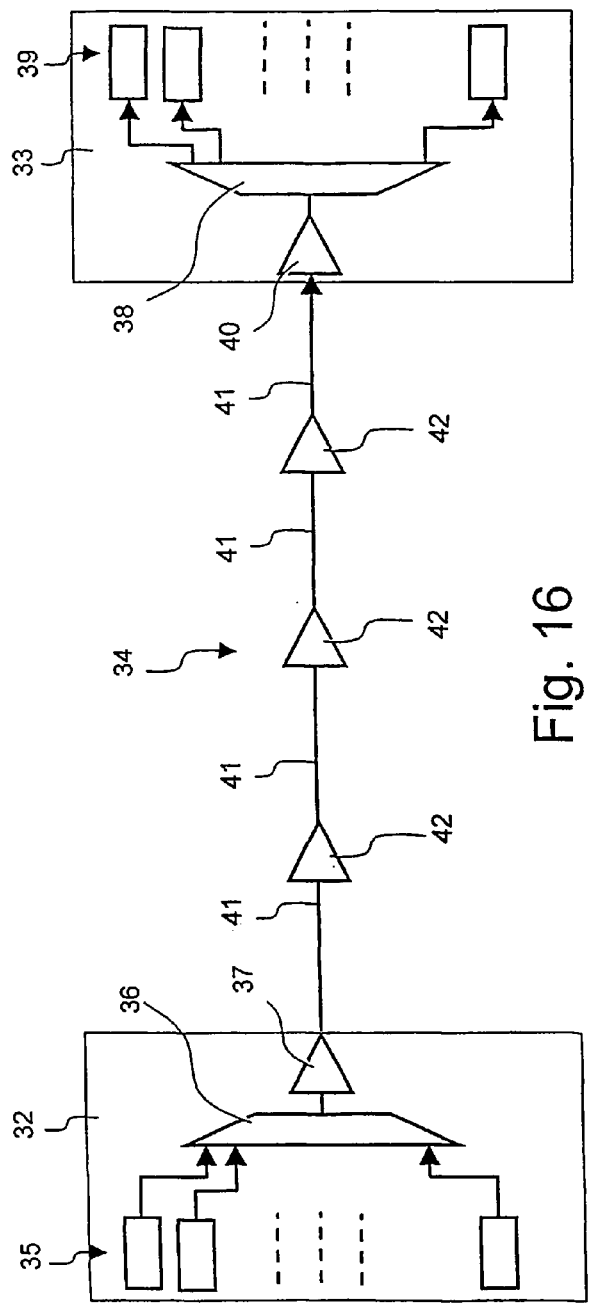
FIG. 16 shows a diagram of a WDM optical transmission system.

As shown in FIG. 16, an optical telecommunications system typically comprises a transmission station 32, a receiving station 33 and an optical communications line 34 connecting the transmission station 32 and receiving station 33. The transmission station 32 comprises a plurality of optical transmitters 35, each of which is able to transmit an optical signal at a respective wavelength. Each optical transmitter 35 may, for example, comprise a source of the laser type and a wavelength converter able to receive the signal generated by the laser and transmit a signal at a predefined wavelength. A wavelength multiplexer 36 is connected on its input side to the transmitters 35 so as to receive the plurality of signals transmitted and has a single output connected to the communication line 34 in order to transmit the wavelength multiplexed signals on the line. The transmission station 32 may also comprise an optical power amplifier 37, which is connected to the output of the multiplexer 36, so as to impart to the signals transmitted the necessary power for transmission along the line 34.

The receiving station 32 comprises a wavelength demultiplexer 38 connected at its input to the line 34 so as to receive the signals transmitted and has a plurality of outputs into which the various wavelengths transmitted are divided. The receiving station 32 also comprises a plurality of optical receivers 39, each connected to a respective output of the demultiplexer 38 in order to receive a signal at a respective wavelength. Each receiver 39 may comprise a wavelength converter to convert the wavelength of the signal into a wavelength suitable for reception of the signal by a photo-detector connected optically to the said converter. The receiving station 32 may also comprise a pre-amplifier 40 arranged upstream of the demultiplexer 38 so as to impart to the signals transmitted the power necessary for correct receiving thereof.

The communication line 34 comprises many sections of optical fibre 41 (preferably single-mode optical fibre) and a plurality of line amplifiers 42 located at a distance from each other (for example a hundred kilometres or so) and designed to amplify the signals to a power level suitable for transmission to the next optical fibre section.

Figure 17:
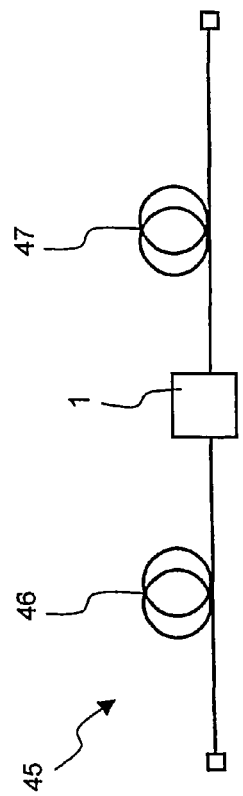
FIG. 17 shows an amplifier of the transmission system according to FIG. 16, comprising the filter according to the invention.

As shown schematically in FIG. 17, at least one of the amplifiers of the transmission system (i.e. the power amplifier 37, the pre-amplifier and the line amplifiers 42), denoted here by 45, is a two-stage amplifier, i.e. it comprises a first and a second active fibres 46, 47 for amplification of the signals, connected in series. As shown, the filter 1 according to the invention may be positioned between the two amplification stages so as to perform equalization of the signals. Alternatively, the filter may be positioned downstream of the two stages.

Lastly, the Applicant has found that the filter according to the invention may be effectively used also as a temperature or deformation sensor since its spectral response is sensitive to variations in temperature and length in accordance with known laws. In particular, by detecting the displacement of predefined points in the filter spectrum it is possible to determine the variation in the parameter measured.

During operation as a temperature sensor, the sensor may be used in order to measure the absolute temperature present in a given environment, after being calibrated to a predefined temperature. In a similar manner, it may be used to measure variations in temperature.

During operation as a deformation sensor, the filter 1 is applied to a body liable to undergo deformation. The variation in the spectral response of the filter 1 following deformation of the body provides a measurement of the said deformation.

The invention claimed is:

1. An optical fiber filter, comprising:
   an optical fiber;
   a pair of first coupling regions; and
   a phase-shift region;
   wherein the optical fiber comprises:
     a core; and
     a cladding;
   wherein an optical signal can pass through the optical fiber,
   wherein the first coupling regions are formed in the optical fiber, at a predefined mutual distance, for producing power transfer between a first propagation mode of the optical signal and a second propagation mode of the optical signal,
   wherein the phase-shift region is defined by a section of the optical fiber, disposed between the first coupling regions, for producing a phase shift between the first and second propagation modes, and
   wherein refractive index profiles of the optical fiber in each of the first coupling regions are asymmetrical due to the presence of a cladding zone with a refractive index higher than a refractive index of the remainder of the cladding.

2. The filter of claim 1, wherein, in each of the first coupling regions, the cladding comprises, in cross-section, an annular sector, and
   wherein, in each annular sector, a refractive index of the annular sector is greater than a refractive index of a remainder of the cladding.

3. The filter of claim 2, wherein the cladding comprises, in cross-section:
   an inner annular region; and
   an outer annular region;
   wherein the inner annular region is adjacent to the core, and
   wherein the inner annular region comprises the annular sectors.

4. The filter of claim 2, wherein the annular sectors are disposed in a substantially-similar angular position.

5. The filter of claim 2, further comprising:
   a pair of second coupling regions formed in the optical fiber;
   wherein the annular sectors are disposed in a first substantially-similar angular position,
   wherein each of the second coupling regions comprises, in cross-section, a further annular sector comprising a refractive index greater than the refractive index of the remainder of the cladding,
   wherein the further annular sectors are disposed in a second substantially-similar angular position, and
   wherein the first substantially-similar angular position is different from the second substantially-similar angular position.

6. The filter of claim 5, wherein each of the second coupling regions is formed in a vicinity of a respective first coupling region.

7. The filter of claim 2, wherein a difference between the refractive index of each of the annular sectors and the refractive index of the remainder of the cladding is greater than or equal to $5\times10^{-4}$.

8. The filter of claim 1, wherein the cladding comprises, in cross-section:
   an inner annular region; and
   an outer annular region;
   wherein the inner annular region is adjacent to the core.

9. The filter of claim 1, wherein, outside of the first coupling regions, the optical fiber comprises, in cross-section, a refractive index profile of a step-index type.

10. The filter of claim 1, wherein the optical signal comprises a wavelength comprised in a predefined transmission wavelength band, and
    wherein the optical fiber is dual-mode in the predefined transmission wavelength band.

11. The filter of claim 8 or 3, wherein the inner annular region comprises silica, and
    wherein the inner annular region comprises oxides of at least one of germanium, phosphorus, and fluorine.

12. An optical fiber filtering device, comprising:
    a plurality of optical fiber filters;
    wherein the optical fiber filters are connected In series,
    wherein each optical fiber filter comprises:
      an optical fiber;
      a pair of coupling regions; and
      a phase-shift region;
    wherein the optical fiber comprises:
      a core; and
      a cladding;
    wherein an optical signal can pass through the optical fiber,
    wherein the coupling regions are formed in the optical fiber, at a predefined mutual distance, for producing power transfer between a first propagation mode of the optical signal and a second propagation mode of the optical signal,
    wherein the phase-shift region is defined by a section of the optical fiber, disposed between the coupling regions, for producing a phase shift between the first and second propagation modes, and wherein refractive index profiles of the optical fiber in each of the coupling regions are asymmetrical due to the presence of a cladding zone with a refractive index higher than a refractive index of the remainder of the cladding.

13. An optical amplifier, comprising:
an optical fiber filter; and
at least one optical amplification stage;
wherein the optical fiber filter is disposed in series with the at least one optical amplification stage,
wherein the optical fiber filter comprises:
an optical fiber;
a pair of coupling regions; and
a phase-shift region;
wherein the optical fiber comprises:
a core; and
a cladding;
wherein an optical signal can pass through the optical fiber,
wherein the coupling regions are formed in the optical fiber, at a predefined mutual distance, for producing power transfer between a first propagation mode of the optical signal and a second propagation mode of the optical signal,
wherein the phase-shift region is defined by a section of the optical fiber, disposed between the coupling regions, for producing a phase shift between the first and second propagation modes, and
wherein refractive index profiles of the optical fiber in each of the coupling regions are asymmetrical due to the presence of a cladding zone with a refractive index higher than a refractive index of the remainder of the cladding.

14. An optical telecommunications system, comprising:
at least one optical transmitter;
at least one optical receiver;
an optical transmission line connecting the at least one optical transmitter to the at least one optical receiver; and
at least one optical amplifier:
wherein the at least one optical amplifier is disposed along the optical transmission line,
wherein the at least one optical amplifier comprises:
an optical fiber filter; and
at least one optical amplification stage;
wherein the optical fiber filter is disposed in series with the at least one optical amplification stage,
wherein the optical fiber filter comprises:
an optical fiber;
a pair of coupling regions; and
a phase-shift region;
wherein the optical fiber comprises:
a core; and
a cladding;
wherein an optical signal can pass through the optical fiber,
wherein the coupling regions are formed in the optical fiber, at a predefined mutual distance, for producing power transfer between a first propagation mode of the optical signal and a second propagation mode of the optical signal,
wherein the phase-shift region is defined by a section of the optical fiber, disposed between the coupling regions, for producing a phase shift between the first and second propagation modes, and
wherein refractive index profiles of the optical fiber in each of the coupling regions are asymmetrical due to the presence of a cladding zone with a refractive index higher than a refractive index of the remainder of the cladding.

15. An optical fiber modal coupler, comprising:
an optical fiber; and
a coupling region;
wherein the optical fiber comprises:
a core; and
a cladding;
wherein an optical signal can pass through the optical fiber,
wherein the coupling region is formed in the optical fiber to produce power transfer between a first propagation mode of the optical signal and a second propagation mode of the optical signal, and
wherein a refractive index profile of the optical fiber in the coupling region is asymmetrical due to the presence of a claddin zone with a refractive index higher than a refractive index of the remainder of the cladding.

* * * * *

UNITED STATES PATENT AND TRADEMARK OFFICE
CERTIFICATE OF CORRECTION

| | | |
|---|---|---|
| PATENT NO. | : 7,177,511 B2 | Page 1 of 1 |
| APPLICATION NO. | : 10/415474 | |
| DATED | : February 13, 2007 | |
| INVENTOR(S) | : Vavassori et al. | |

It is certified that error appears in the above-identified patent and that said Letters Patent is hereby corrected as shown below:

Claim 12, Column 16, Line 51, "In" should read --in--.

Claim 14, Column 17, Line 43, "amplifier:" should read --amplifier;--.

Claim 15, Column 18, Line 43, "claddin" should read --cladding--.

Signed and Sealed this

Eighteenth Day of December, 2007

JON W. DUDAS
*Director of the United States Patent and Trademark Office*